(12) United States Patent
Zacharias et al.

(10) Patent No.: US 8,308,120 B2
(45) Date of Patent: Nov. 13, 2012

(54) ADJUSTING DEVICE FOR THE LONGITUDINAL ADJUSTMENT OF AN AUTOMOTIVE COMPONENT

(75) Inventors: Michael Zacharias, Leichlingen (DE); Uwe Schmale, Hückeswagen (DE); Jürgen Stemmer, Remscheid (DE); Denis Giorgio, Remscheid (DE)

(73) Assignee: Johnson Controls GmbH, Burscheid (DE)

( * ) Notice: Subject to any disclaimer, the term of this patent is extended or adjusted under 35 U.S.C. 154(b) by 255 days.

(21) Appl. No.: 12/676,551

(22) PCT Filed: Aug. 28, 2008

(86) PCT No.: PCT/EP2008/007055
§ 371 (c)(1),
(2), (4) Date: Jun. 2, 2010

(87) PCT Pub. No.: WO2009/033570
PCT Pub. Date: Mar. 19, 2009

(65) Prior Publication Data
US 2010/0276561 A1    Nov. 4, 2010

(30) Foreign Application Priority Data
Sep. 7, 2007  (DE) .......................... 10 2007 042 595

(51) Int. Cl.
*F16M 13/00* (2006.01)
(52) U.S. Cl. ...................................... 248/429
(58) Field of Classification Search .................. 248/424, 248/429, 430; 297/344.11
See application file for complete search history.

(56) References Cited

U.S. PATENT DOCUMENTS

| 5,782,138 | A  | * | 7/1998 | Groche .......................... 74/527 |
| 7,191,995 | B2 | * | 3/2007 | Kim .............................. 248/429 |
| 7,669,825 | B2 | * | 3/2010 | Sung ............................. 248/429 |
| 2003/0006355 | A1 | * | 1/2003 | Horsfield et al. ............. 248/429 |

(Continued)

FOREIGN PATENT DOCUMENTS
DE       27 13 973 A1    10/1978
(Continued)

OTHER PUBLICATIONS
International Search Report corresponding to PCT/EP2008/007055, dated Feb. 24, 2009, 2 pages.

(Continued)

*Primary Examiner* — Ramon Ramirez
(74) *Attorney, Agent, or Firm* — Foley & Lardner LLP

(57) ABSTRACT

The invention relates to an adjusting device for the longitudinal adjustment of an automotive component, especially a vehicle seat. The adjusting device comprises an upper longitudinal rail with respect to the adjusting device and a lower longitudinal rail with respect to the adjusting device. The adjusting device comprises a locking device in such a manner that when the locking device is activated, a relative adjustment of the longitudinal rails in relation to each other can be blocked and when the locking device is released, the longitudinal rails can be unblocked. The locking device comprises a plurality of detent pins, at least one detent pin being adjusted in the locking position to lock the longitudinal rails and all detent pins being adjusted in a release position to release the longitudinal rails. The detent pins have a detent profile that is designed in such a manner that a first front section of the detent pin has a flare angle and a second section of the detent pin has a transition.

12 Claims, 4 Drawing Sheets

U.S. PATENT DOCUMENTS

| | | | |
|---|---|---|---|
| 2003/0164434 A1* | 9/2003 | Frohnhaus et al. | 248/430 |
| 2004/0238712 A1 | 12/2004 | Oh | |
| 2006/0071140 A1* | 4/2006 | Kim | 248/430 |
| 2011/0298264 A1* | 12/2011 | Ito et al. | 297/341 |

FOREIGN PATENT DOCUMENTS

| | | |
|---|---|---|
| DE | 28 11 970 A1 | 10/1978 |
| DE | 4242895 C1 | 11/1993 |
| DE | 44 44 075 A1 | 6/1995 |
| DE | 196 17 691 C1 | 5/1997 |
| DE | 19824038 C1 | 7/1999 |
| DE | 102 62 182 B4 | 10/2006 |
| EP | 0 944 38 B1 | 12/1985 |
| EP | 1 769 964 A2 | 4/2007 |
| WO | WO 2006/053145 A1 | 5/2006 |

OTHER PUBLICATIONS

International Preliminary Report on Patentability issued on Apr. 7, 2010 in PCT/EP2008/007055, 5 pages.

German Examination Report dated Feb. 21, 2008 as received in corresponding German Application No. 10 2007 042 595.5-14, 5 pages.

German Examination Report dated Jan. 25, 2010 as received in corresponding German Application No. 10 2007 042 595.5-14, 6 pages.

\* cited by examiner

ADJUSTING DEVICE FOR THE LONGITUDINAL ADJUSTMENT OF AN AUTOMOTIVE COMPONENT

CROSS-REFERENCE TO RELATED APPLICATIONS

This is a National Stage application of PCT/EP2008/007055, filed Aug. 28, 2008, which claims the benefit and priority of German Patent Application No. 10 2007 042 595.5, filed Sep. 7, 2007. The foregoing applications are incorporated by reference herein in their entirety.

BACKGROUND

The present invention is based on an adjusting device for the longitudinal adjustment of an automotive component, in particular of a vehicle seat, the adjusting device comprising an upper longitudinal rail arranged in the direction of adjustment and a lower longitudinal rail arranged in the direction of adjustment, the adjusting device comprising a locking device, such that by locking the locking device a relative adjustment of the longitudinal rails in relation to each other may be blocked, and by unlocking the locking device the longitudinal rails may be unblocked, the locking device comprising a plurality of detent pins, at least one detent pin being set in a locked position to lock the longitudinal rails and all detent pins being set in an unlocked position to unlock the longitudinal rails.

Such adjusting devices are generally known. For example, a lock for a longitudinal adjustment of a seat is disclosed in the publication DE 42 42 895 C1, in which an actuating lever moves a detent pin via a support, the support being configured as a cam track for setting various lever ratios. A drawback therewith is that a relatively complicated and thus more costly design of the locking device is proposed.

SUMMARY

It is, therefore, the object of the present invention to provide a locking device in which by means of a simple and small design a very cost-effective embodiment of the adjusting device is possible, on the one hand, which also only requires a small installation space, but nevertheless maximum locking accuracy and thus maximum comfort with regard to possible noise development and maximum longevity and robustness of the functionality of the adjusting device being achieved over the entire life of a vehicle.

This object is achieved by an adjusting device for the longitudinal adjustment of an automotive component, in particular of a vehicle seat, the adjusting device comprising an upper longitudinal rail arranged in the direction of adjustment and a lower longitudinal rail arranged in the direction of adjustment, the adjusting device comprising a locking device, such that by locking the locking device a relative adjustment of the longitudinal rails in relation to each other may be blocked, and by unlocking the locking device the longitudinal rails may be unblocked, the locking device comprising a plurality of detent pins, at least one detent pin being set in a locked position to lock the longitudinal rails, and all detent pins being set in an unlocked position to unlock the longitudinal rails, the detent pins comprising a detent profile, in a first front section of the detent pin a flare angle being provided and in a second section of the detent pin a transition being provided. The flare angle, considered in the context of the present invention, is always understood to be in a plane parallel to the direction of adjustment. As a result, by simple means the adjusting device may be produced to be particularly small and lightweight (and for this reason particularly stable and/or for example torsionally rigid) as, in particular, a lever present for actuating the detent pins may be rotatably mounted in a channel region between the longitudinal rails, and thus effects a considerable saving in installation space. This is, in particular, firstly because, due to the small flare angle of the shape of the detent pin in the first section, a considerable reduction in the clearance is already possible when setting the locked position of the detent pin and secondly because, due to the transition in the second section of the detent pin, the full diameter of the detent pin is very rapidly reached and thus only a shorter distance in the direction of the longitudinal dimension of the detent pin is required for complete locking and/or for setting the locked position of the detent pin. By such a shaping of the detent pin according to the invention, it may further be achieved that the detent pins have a high degree of stability and thus a high resistance to shear forces.

The object is further achieved by an adjusting device for the longitudinal adjustment of an automotive component, in particular of a vehicle seat, the adjusting device comprising an upper longitudinal rail arranged in the direction of adjustment and a lower longitudinal rail arranged in the direction of adjustment, the adjusting device comprising a locking device, such that by locking the locking device a relative adjustment of the longitudinal rails in relation to each other may be blocked and by unlocking the locking device the longitudinal rails may be unblocked, the locking device comprising a plurality of detent pins, at least one detent pin being set in a locked position to lock the longitudinal rails, and all detent pins being set in an unlocked position to unlock the longitudinal rails, the plurality of detent pins being provided to be mobile for locking and/or unlocking the longitudinal rails by means of a lever rotatably mounted between the longitudinal rails. As a result, a compact design of the adjusting device may be effected in a simple manner, also resulting in advantages in terms of cost.

According to the invention, it is particularly preferred that in a sectional plane extending perpendicular to the direction of adjustment the longitudinal rails encompass a round or polygonal channel region, in particular a rectangular channel region, the mounting of the lever being provided in the channel region. As a result, firstly a particularly high degree of stability of the entire rail arrangement of the longitudinal rails may be achieved and furthermore space is created for arranging the lever for moving the detent pins, so that the adjusting device as a whole requires a particularly small installation space.

It is further preferred according to the invention that the plurality of detent pins are provided guided substantially horizontally. As a result, firstly valuable installation space in the vertical Z-direction may be saved and secondly the connection of the vehicle components, in particular of the vehicle seat, may also be implemented in a particularly stable manner.

According to the invention, it is further preferred that for the locking of the longitudinal rails without clearance at least two detent pins are set in the locked position. As the Vernier principle is applied simultaneously between the detent pins and the slots in one of the longitudinal rails, it is ensured that in each position it is possible to lock the longitudinal rails—albeit with clearance—at least so that a high degree of safety may be implemented in the adjusting device according to the invention.

It is further preferred according to the invention that it is possible to lock the longitudinal rails without clearance with an incremental displacement of approximately 2 mm to approximately 10 mm, preferably of approximately 3 mm to approximately 6 mm, particularly preferably of approximately 4.5 mm to approximately 5.0 mm. As a result, the comfort requirements of a user of the motor vehicle seat may be met, after which a detailed differentiation of the possible set positions of the vehicle seat is possible with locking without clearance. Furthermore, it is also preferred that the movement of the detent pin with the same rotation of the lever in the locked position of the detent pin is greater than in the unlocked position of the detent pin. As a result, it may be easily achieved that the actuating force for actuating the lever (in the direction of the unlocked position of the detent pin(s)) remains substantially the same or in any case does not increase too greatly, namely as a plurality of detent pins are moved (in each case against a spring force) toward the unlocked position.

BRIEF DESCRIPTION OF THE DRAWINGS

Embodiments of the invention are shown in the drawings and described in more detail in the following description.

DETAILED DESCRIPTION

Figure 1:
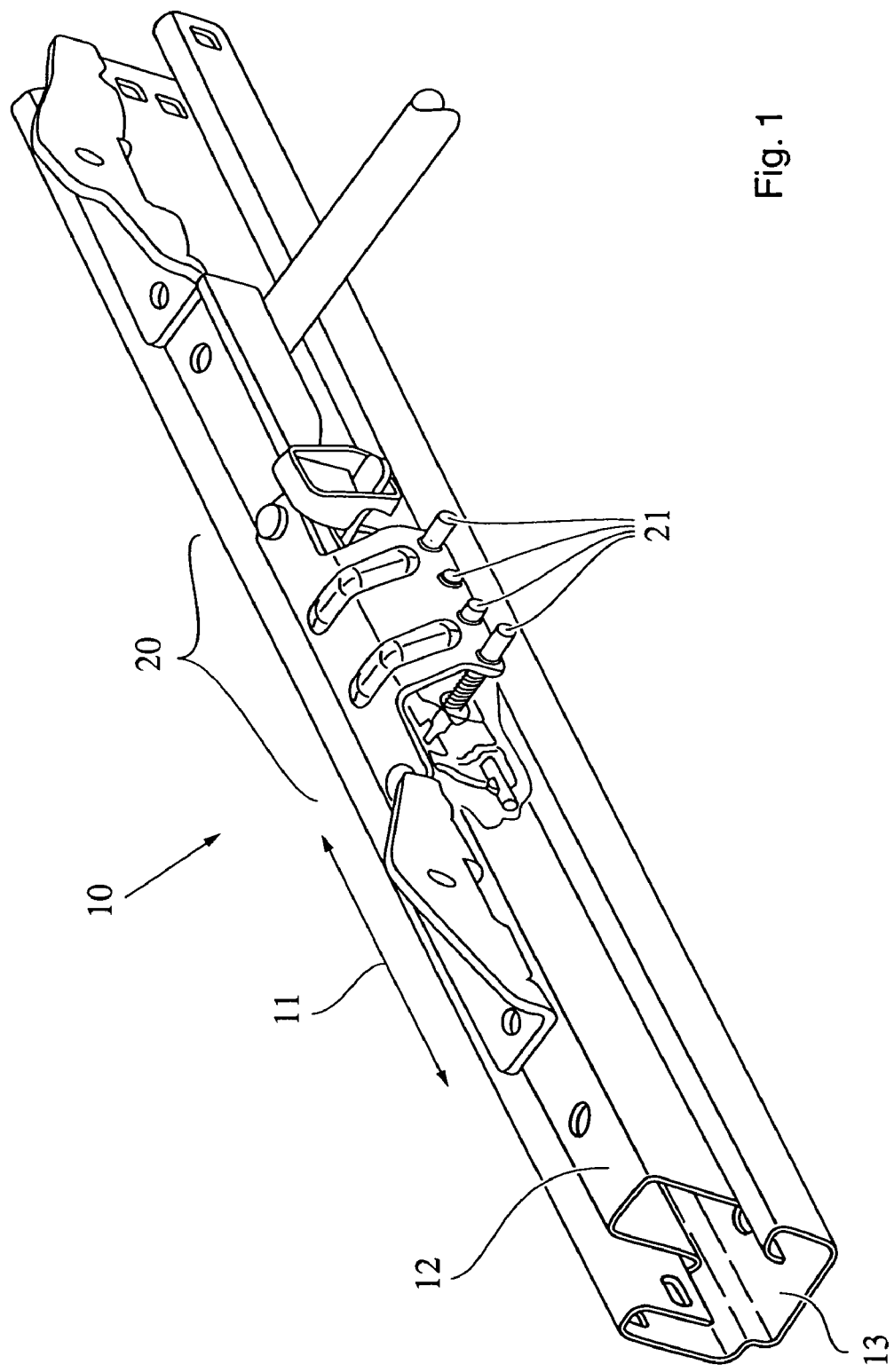
FIG. 1 shows a perspective view of an adjusting device according to the invention
Figure 2:
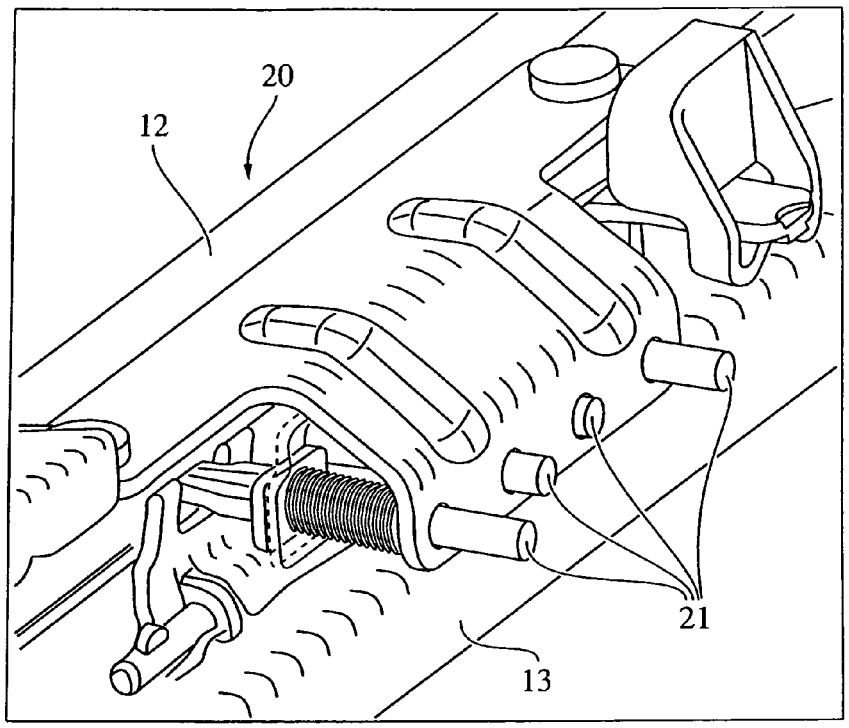
FIG. 2 shows a perspective detailed view of the adjusting device according to the invention

In FIG. 1, an adjusting device 10 according to the invention is shown with an upper longitudinal rail 12 and a lower longitudinal rail 13 in a perspective view. The longitudinal rails 12, 13 are provided elongated substantially in a direction of adjustment 11, so that an adjusting movement of an automotive component (in particular a vehicle seat) fixedly connected to the upper longitudinal rail 12 is possible relative to an automotive component fixedly connected to the lower longitudinal rail 13, in particular the chassis of the vehicle in the direction of adjustment 11. The adjusting device 10 further comprises a locking device 20, which has at least one locking pin 21 and/or detent pin 21, in practice however a plurality—in particular four. Said detent pins 21 are able to be set into an unlocked position and able to be set into a locked position. The movement of the detent pins 21 between the unlocked position and the locked position is substantially a linear movement. This movement is driven by a rotatably mounted lever 25. Said lever, in turn, is driven by an actuating lever, not shown in more detail, which in turn is actuated manually by a user of the adjusting device or may even be actuated by means of an actuator (not shown). An enlarged view of the region of the locking device 20 is shown in FIG. 2, also in a perspective view.

Figure 4:
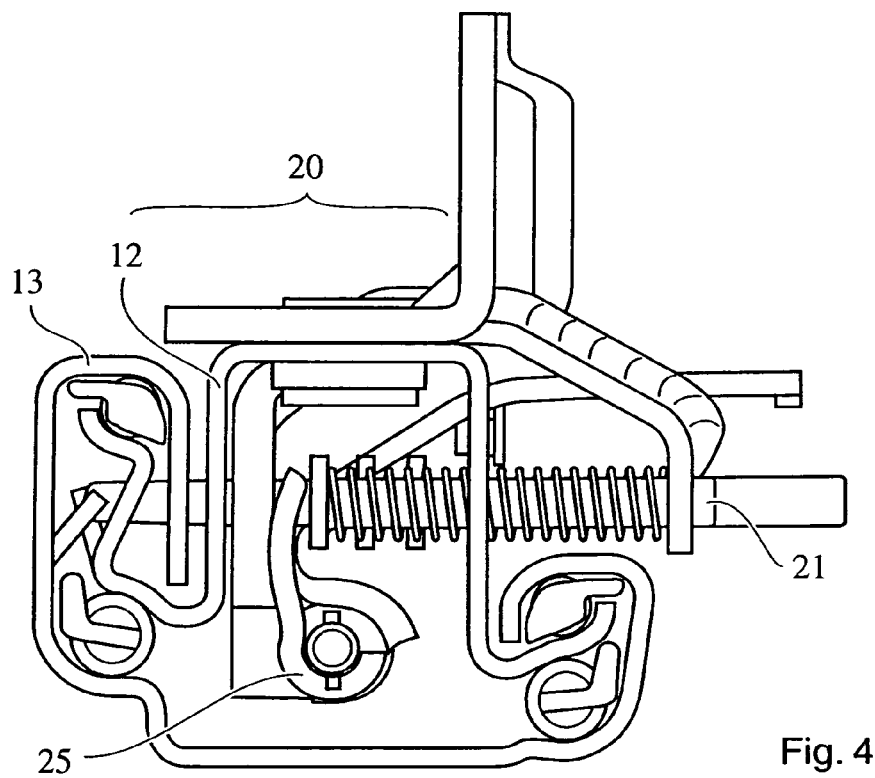
FIGS. 4 and 5 show in each case a sectional view of the adjusting device in a plane perpendicular to the direction of adjustment.
Figure 5:
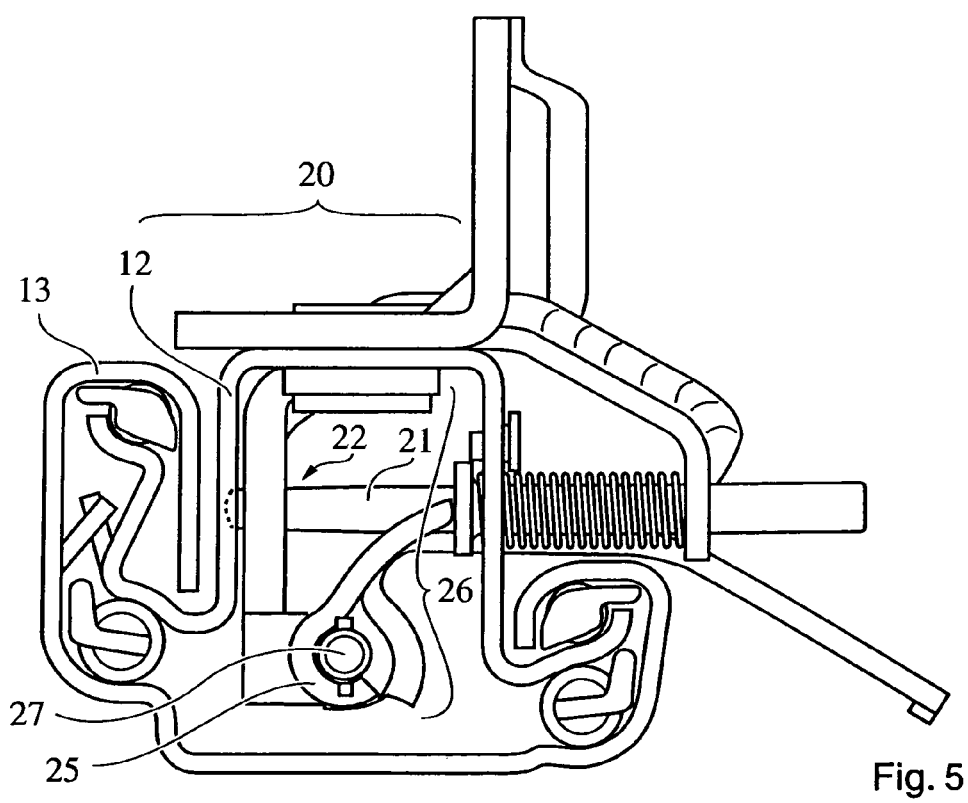

According to the invention, it is provided, in particular, that the rotatably mounted lever 25 is rotatably mounted in a channel region between the longitudinal rails 12, 13. This situation may be seen particularly clearly in FIGS. 4 and 5. These two figures represent sectional views through the adjusting device 10 in the region of the locking device 20 in a sectional plane located substantially perpendicular to the direction of adjustment. In this connection, in FIG. 4 the locked position of the detent pin 21 is shown and in FIG. 5 the unlocked position of the detent pin 21 is shown. In particular in FIG. 5, it may be seen that the detent pin 21 has a locking contour 22, and the lever 25 is rotatably mounted in the channel region 26 on a rotational axis 27, in order to effect the movement of the detent pin 21 between the locked position and the unlocked position. Generally, in this connection, the detent pin 21 is pretensioned by a spring into a position, in particular into the locked position (FIG. 4). According to the invention, as an alternative to one spring per detent pin, it may be provided (not shown) that a common spring, in particular a leaf spring, acts on all detent pins 21.

Figure 3:
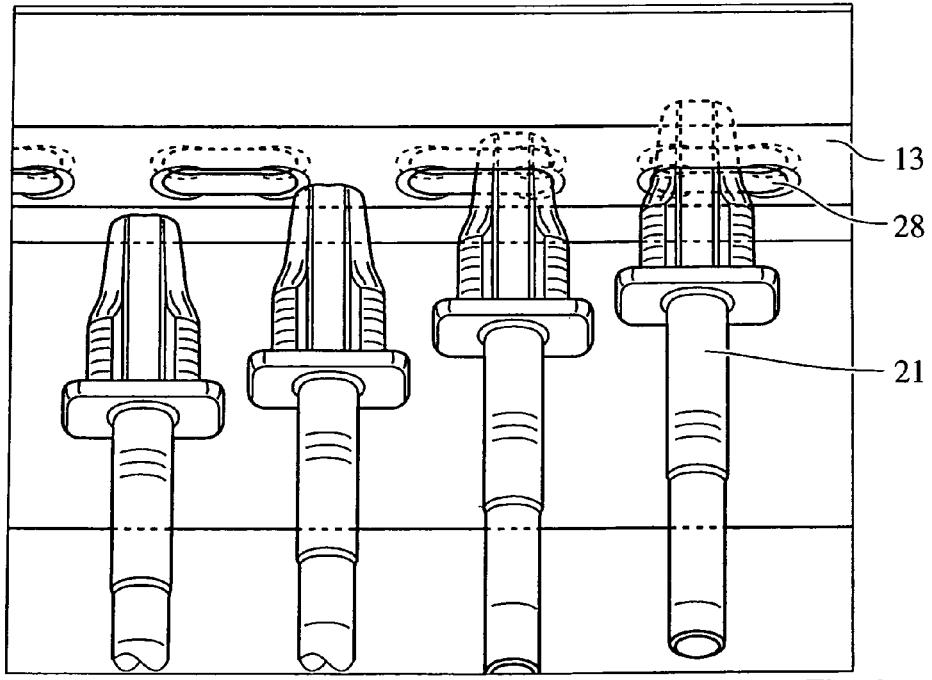
FIG. 3 shows a detailed view of an arrangement of the detent pins of the adjusting device according to the invention.
Figure 6:
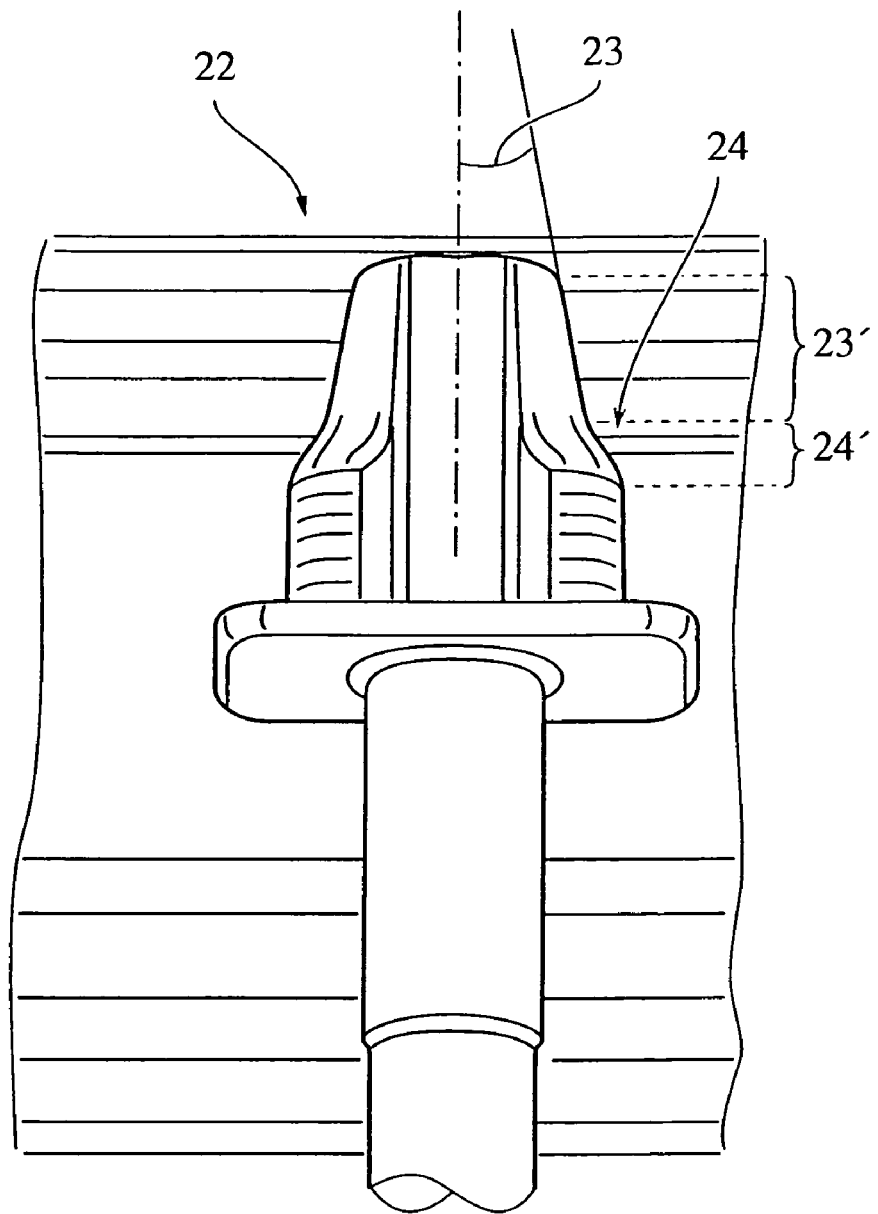
FIG. 6 shows a further enlarged detailed view of the front region of a detent pin.

The detent profile 22 of the detent pins 21 is described below in more detail with reference to FIGS. 3 and 6. In FIG. 3, in this case, a schematic and perspective view of the arrangement of the detent pins 21 is shown relative to slots 28 present in the lower longitudinal rail 13. In this connection, it is the case that the slots 28 and the detent pins are arranged relative to one another and spaced apart such that in any set position of the longitudinal rails 12, relative to one another an engagement of at least one detent pin 21 in a slot 28 is possible. Due to the shape of the slots 28, however, locking of the longitudinal rails 12, 13 without clearance is not possible on its own; to this end the engagement of a further detent pin 21 is necessary. Such a locking of the longitudinal rails 12, 13 without clearance is only possible in specific relative positions of the longitudinal rails 12, 13 to one another, spaced apart from one another by incremental displacements, whereby a latched connection results. In FIG. 6, the detent profile 22 of an individual detent pin 21 is shown in enlarged view. It is visible therefrom that the detent pin in its front region, i.e. in its region which is used for locking to the lower longitudinal rail 13, in a first section 23' has a first smaller flare angle 23 and in a second section 24' has a second larger flare angle 24 or however a step (not shown). The flare angle is preferably in the range of approximately 5° to approximately 40°, particularly preferably in the range of approximately 10° to approximately 25°, quite particularly preferably in the range of approximately 15° to approximately 20°. After the second section 24' of the detent profile 22, the flare angle substantially entirely disappears. In one direction perpendicular to the direction of adjustment 11, the detent pin may have a recess or a groove which—in particular effected on both sides (upper side, lower side)—is provided for guidance (by means of corresponding lugs not shown).

In the embodiment shown, the adjusting device 10 is provided such that the locking device 20 (and thus the detent pins 21) are arranged on the upper longitudinal rail 12, and the detent profile 22 is latched to slots 28 in the lower longitudinal rail 13, but according to the invention a reverse arrangement is also possible.

LIST OF REFERENCE NUMERALS

10 Adjusting device
11 Direction of adjustment
12 Upper longitudinal rail
13 Lower longitudinal rail
20 Locking device
21 Detent pin
22 Detent profile
23 Flare angle
23' First section
24 Transition
24' Second section
25 Rotatably mounted lever
26 Channel region
27 Rotational axis of the lever
28 Slots of the lower longitudinal rail

The invention claimed is:

1. An adjusting device for longitudinal adjustment of a vehicle seat, comprising:
   an upper longitudinal rail arranged in a direction of adjustment;
   a lower longitudinal rail arranged in the direction of adjustment;
   a locking device configured such that by locking the locking device a relative adjustment of the upper and lower longitudinal rails in relation to each other is blocked, and by unlocking the locking device the relative adjustment of the upper and lower longitudinal rails is unblocked; and
   a plurality of detent pins being configured such that at least one detent pin from the plurality of detent pins is set in a locked position to lock the upper and lower longitudinal rails and all the detent pins from the plurality of detent pins are set in an unlocked position to unlock the upper and lower longitudinal rails,
   wherein the plurality of detent pins are provided to be mobile for locking and unlocking the upper and lower longitudinal rails by a lever rotatably mounted between the upper and lower longitudinal rails,
   wherein the plurality of detent pins are configured to be guided substantially horizontally, and
   wherein, with a same rotation of the lever, a movement of a detent pin from the plurality of detent ns in the locked position is greater than a movement of a detent pin from the plurality of detent pins in the unlocked position.

2. The adjusting device as claimed in claim 1, wherein, in a sectional plane extending perpendicular to the direction of adjustment, the upper and lower longitudinal rails encompass a round or polygonal channel region, a mounting of the lever being provided in the channel region.

3. The adjusting device as claimed in claim 1, wherein for the locking of the upper and lower longitudinal rails without clearance at least two detent pins from the plurality of detent pins are configured to be set in the locked position.

4. The adjusting device as claimed in claim 1, wherein the upper and lower longitudinal rails are configured to lock without clearance with an incremental displacement of approximately 2 mm to approximately 10 mm.

5. The adjusting device as claimed in claim 1, wherein, in a sectional plane extending perpendicular to the direction of adjustment, the upper and lower longitudinal rails encompass a rectangular channel region, a mounting of the lever being provided in the channel region.

6. The adjusting device as claimed claim 1, wherein the upper and lower longitudinal rails are configured to lock without clearance with an incremental displacement of approximately 3 mm to approximately 6 mm.

7. An adjusting device for longitudinal adjustment of a vehicle seat, comprising:
   an upper longitudinal rail arranged in a direction of adjustment;
   a lower longitudinal rail arranged in the direction of adjustment;
   a locking device configured such that by locking the locking device a relative adjustment of the upper and lower longitudinal rails in relation to each other is blocked, and by unlocking the locking device the relative adjustment of the upper and lower longitudinal rails is unblocked;
   a plurality of detent pins being configured such that at least one detent pin of the plurality of detent pins is set in a locked position to lock the upper and lower longitudinal rails and all the detent pins of the plurality of detent pins are set in an unlocked position to unlock the upper and lower longitudinal rails,
   wherein the plurality of detent pins are provided to be mobile for locking and unlocking the upper and lower longitudinal rails by a lever rotatably mounted between the upper and lower longitudinal rails,
   wherein the plurality of detent pins are configured to be guided substantially horizontally,
   wherein, with a same rotation of the lever, a movement of a detent pin from the plurality of detent pins in the locked position is greater than a movement of a detent pin from the plurality of detent pins in the unlocked position,
   wherein the detent pins comprise a detent profile comprising a flare angle in a first front section and a transition in a second section.

8. The adjusting device as claimed in claim 7, wherein, in a sectional plane extending perpendicular to the direction of adjustment, the upper and lower longitudinal rails encompass a round or polygonal channel region, a mounting of the lever being provided in the channel region.

9. The adjusting device as claimed in claim 7, wherein for the locking of the upper and lower longitudinal rails at least two detent pins from the plurality of detent pins are configured to be set in the locked position.

10. The adjusting device as claimed claim 7, wherein the upper and lower longitudinal rails are configured to lock with an incremental displacement of approximately 2 mm to approximately 10 mm.

11. The adjusting device as claimed in claim 7, wherein, in a sectional plane extending perpendicular to the direction of adjustment, the upper and lower longitudinal rails encompass a rectangular channel region, a mounting of the lever being provided in the channel region.

12. The adjusting device as claimed claim 7, wherein the upper and lower longitudinal rails are configured to lock without clearance with an incremental displacement of approximately 3 mm to approximately 6 mm.

* * * * *